United States Patent
Powdrill et al.

(10) Patent No.: US 11,984,046 B2
(45) Date of Patent: May 14, 2024

(54) SURGICAL SKILLS TRAINING MODEL

(71) Applicant: University of Kentucky Research Foundation, Lexington, KY (US)

(72) Inventors: Samuel G. Powdrill, Wilmore, KY (US); DeShana Collett, Nicholasville, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 941 days.

(21) Appl. No.: 16/994,857

(22) Filed: Aug. 17, 2020

(65) Prior Publication Data

US 2021/0049932 A1  Feb. 18, 2021

Related U.S. Application Data

(60) Provisional application No. 62/887,782, filed on Aug. 16, 2019.

(51) Int. Cl.
*G09B 23/30* (2006.01)
*B32B 3/08* (2006.01)
*B32B 5/24* (2006.01)
*B32B 27/12* (2006.01)

(52) U.S. Cl.
CPC ............... *G09B 23/30* (2013.01); *B32B 3/08* (2013.01); *B32B 5/24* (2013.01); *B32B 27/12* (2013.01); *B32B 2250/05* (2013.01); *B32B 2250/40* (2013.01); *B32B 2262/0261* (2013.01)

(58) Field of Classification Search
None
See application file for complete search history.

(56) References Cited

U.S. PATENT DOCUMENTS

| | | | |
|---|---|---|---|
| 4,481,001 A | 11/1984 | Graham et al. | |
| 4,789,340 A * | 12/1988 | Zikria | G09B 23/28 434/262 |
| 8,814,573 B2 | 8/2014 | Nguyen | |
| 8,915,742 B2 | 12/2014 | Hendrickson et al. | |
| 8,961,190 B2 * | 2/2015 | Hart | G09B 23/285 434/267 |
| 9,472,123 B2 | 10/2016 | Trotta et al. | |
| 9,514,658 B1 | 12/2016 | Hart et al. | |
| 10,049,601 B2 | 8/2018 | Chanda et al. | |
| 10,074,292 B2 | 9/2018 | Lowe | |

(Continued)

FOREIGN PATENT DOCUMENTS

| | | | |
|---|---|---|---|
| CN | 201302779 Y | 9/2009 | |
| JP | 2010029650 A | 2/2010 | |
| WO | WO-2016158884 A1 * | 10/2016 | A61M 5/00 |

OTHER PUBLICATIONS

English Machine Translation of CN201302779Y obtained from espacenet.com on Sep. 11, 2019.

(Continued)

*Primary Examiner* — James B Hull
(74) *Attorney, Agent, or Firm* — Stites & Harbison PLLC; Warren D. Schickli

(57) ABSTRACT

A surgical skills training model has an elongated body including muscle, fascia, subcutaneous tissue, connective tissue and skin mimicking layers. The fascia and connective tissue layer are made from a material having a stretch direction that is aligned with a longitudinal axis of the muscle layer and the body of the model.

6 Claims, 4 Drawing Sheets

(56) References Cited

U.S. PATENT DOCUMENTS

| | | |
|---|---|---|
| 10,144,204 B2 | 12/2018 | Patil et al. |
| 10,150,265 B1 | 12/2018 | Hart et al. |
| 10,332,425 B2 | 6/2019 | Hofstetter et al. |
| 2013/0192741 A1* | 8/2013 | Trotta .................... G09B 23/30 264/294 |
| 2017/0069231 A1 | 3/2017 | Trotta et al. |
| 2017/0186340 A1 | 6/2017 | Ogawa et al. |
| 2018/0075777 A1* | 3/2018 | Iverson ................... G09B 23/30 |
| 2018/0282545 A1 | 3/2018 | Chanda et al. |
| 2019/0012934 A1 | 1/2019 | Lowe |

OTHER PUBLICATIONS

English Machine Translation of JP2010029650A obtained from espacenet.com on Sep. 11, 2019.

* cited by examiner

SURGICAL SKILLS TRAINING MODEL

RELATED APPLICATION

This application claims the benefit of U.S. Provisional Patent Application Ser. No. 62/887,782 filed on Aug. 16, 2019, the full disclosure of which is incorporated herein by reference.

TECHNICAL FIELD

This document relates generally to the medical training field and, more particularly, to a new and improved surgical skills training model.

BACKGROUND

Simulation models are well known in the medical training field. Such models are an important intermediate step in the education process allowing medical students and personnel to apply knowledge gained from textbooks and in the classroom and actually work through the medical procedure to gain confidence before actually performing that procedure on a live patient.

This document relates to a new and improved surgical skills training model that more closely mimics the various tissues of the body to provide medical students and personnel with a more realistic and authentic representation of performing an actual medical procedure on a patient.

Advantageously, the surgical skills training model is a useful training tool for various procedures including, but not necessarily limited to:

A. Simple suture placement
B. Placement of deep sutures in muscle and fascia tissue layers
C. Subcutaneous an inter-muscular injections
D. Placement of local anesthetic
E. Plastic surgical skin flaps and skin closures such as Z plasty and V to Y closures
F. Various types of wounds or incisions (These can be constructed realistically to the preference of the instructor or student.)
G. Punch biopsies
H. Very realistic abscesses (These can be created under the skin surface.)
I. IV and blood drawing procedures (These can be performed and practiced on the realistic veins, which can be included during manufacture, just under the skin surface.)
J. Skin lesion removal
K. Tissue undermining and closure of an elliptical wound or incision (This is needed where a lesion has been removed and the skin is under tension).

SUMMARY

In accordance with the purposes and benefits set forth herein, a new and improved surgical skills training model is provided. That surgical skills training model comprises; (a) a muscle layer having a bottom wall and a curved upper wall, (b) a subcutaneous tissue layer overlying said curved upper wall and (c) a skin layer overlying said subcutaneous tissue layer.

In one or more of the many possible embodiments of the surgical skills training model, the model further includes a fascia layer between the subcutaneous tissue layer and the muscle layer. That fascia layer may be made from a material having at least one stretch direction. That one stretch direction may be aligned with a longitudinal axis of the muscle layer. In at least one embodiment, the fascia layer is made from a two-way elastane material or a four-way elastane material.

For purposes of this document, an elastane material refers to a material including from 1.0 to 100% elastane. One particularly useful material comprises 85% nylon and 15% elastane such as Spandex or Lycra.

In one or more of the many possible embodiments of the surgical skills training model, the model further includes a connective tissue layer between the subcutaneous tissue layer and the skin layer. That connective tissue layer may be made from a material having at least one stretch direction. That stretch direction may be aligned with a longitudinal axis of the muscle layer. In at least one embodiment, the fascia layer is made from a two-way elastane material or a four-way elastane material.

In one or more of the many possible embodiments of the surgical skills training model, the bottom wall is substantially flat. Still further, the bottom wall and exposed edges of the subcutaneous tissue layer may form a continuous base adapted for engaging a support surface upon which the surgical skills training model rests.

In one or more of the many possible embodiments of the surgical skills training model, the surgical skills training model includes at least one simulated blood vessel inbetween the skin layer and the subcutaneous tissue layer.

In accordance with yet another aspect, a surgical skills training model is provided comprising: (a) a muscle layer, (b) a subcutaneous tissue layer overlying the muscle layer, (c) a skin layer overlying the subcutaneous tissue layer and (d) a connective tissue layer between the subcutaneous tissue layer and the skin layer, the connective tissue layer being made from a material having at least one stretch direction aligned with a longitudinal axis of the muscle layer.

In one or more of the many possible embodiments of the surgical skills training model, that material is a two-way elastane material. In one or more of the many possible embodiments of the surgical skills training model, that material is a four-way elastane material.

In accordance with yet another aspect, a surgical skills training model is provided comprising: (a) a muscle layer having a substantially flat bottom wall and a curved upper wall, (b) a subcutaneous tissue layer overlying the curved upper wall and (c) a skin layer overlying the subcutaneous tissue layer wherein the bottom wall and exposed edges of the subcutaneous tissue layer form a continuous base adapted for engaging a support surface upon which the surgical skills training model rests.

In the following description, there are shown and described several embodiments of the surgical skills training model. As it should be realized, the surgical skills training model is capable of other, different embodiments and its several details are capable of modification in various, obvious aspects all without departing from the surgical skills training model as set forth and described in the following claims. Accordingly, the drawings and descriptions should be regarded as illustrative in nature rather than restrictive.

BRIEF DESCRIPTION OF THE DRAWING FIGURES

The accompanying drawing figures incorporated herein and forming a part of this patent specification, illustrate several aspects of the surgical skills training model and together with the description serve to explain certain principles thereof.

Figure 1A:
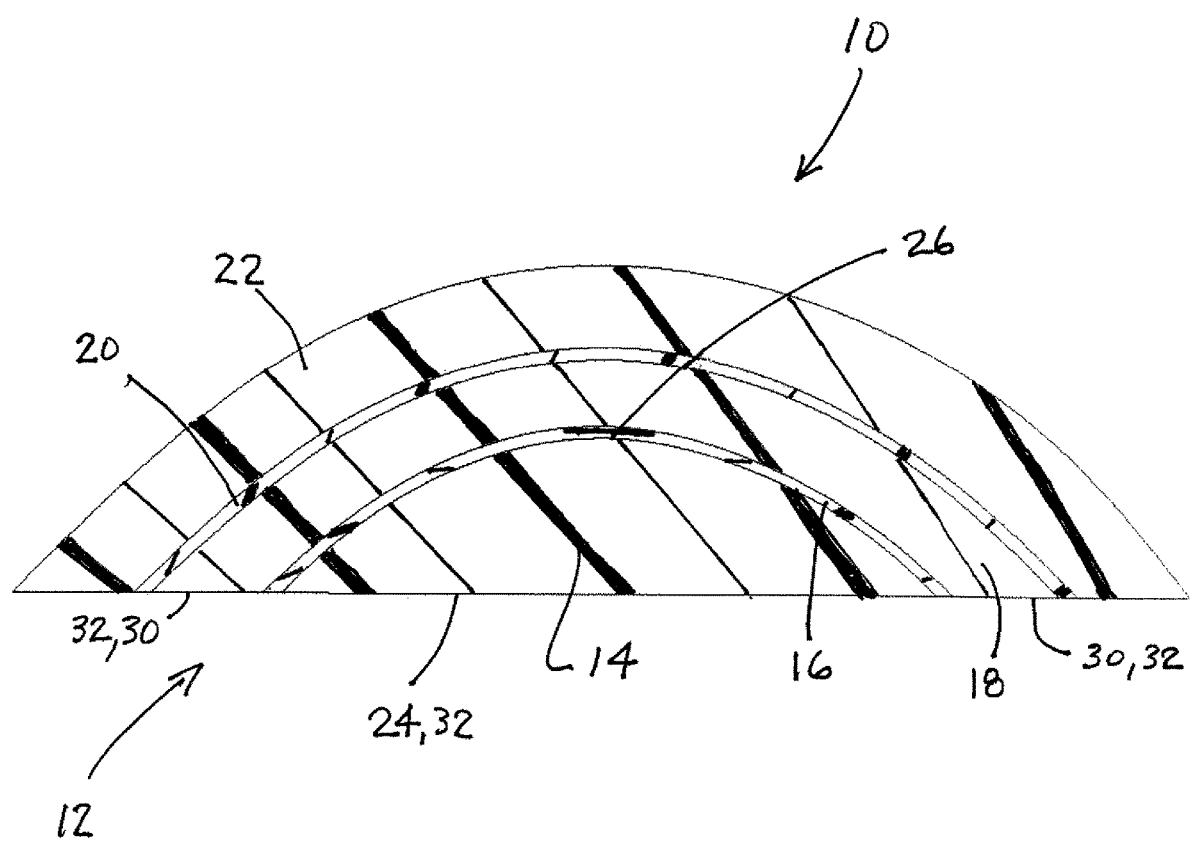
FIG. 1A is a cross-sectional view of a first embodiment of the surgical skills training model.

The drawings are not necessarily drawn proportionally or to scale. For example, the dimensions of some of the elements may be exaggerated relative to other elements for clarity or several physical components may be included in one functional block or element. Further, sometimes reference numerals may be repeated among the drawings to indicate corresponding or analogous elements.

DETAILED DESCRIPTION

In the following detailed description, numerous specific details are set forth to provide a thorough understanding of the disclosed concepts. Those of ordinary skill in the art will know that the disclosed surgical skills training model may be practiced without these specific details. In other instances, well-known methods, procedures, components, or structures may not have been described in detail so as not to obscure other details of the novel surgical skills training model.

The description provided below and in regard to the figures applies to all embodiments unless noted otherwise, and features common to each embodiment are similarly shown and numbered.

Figure 1B:
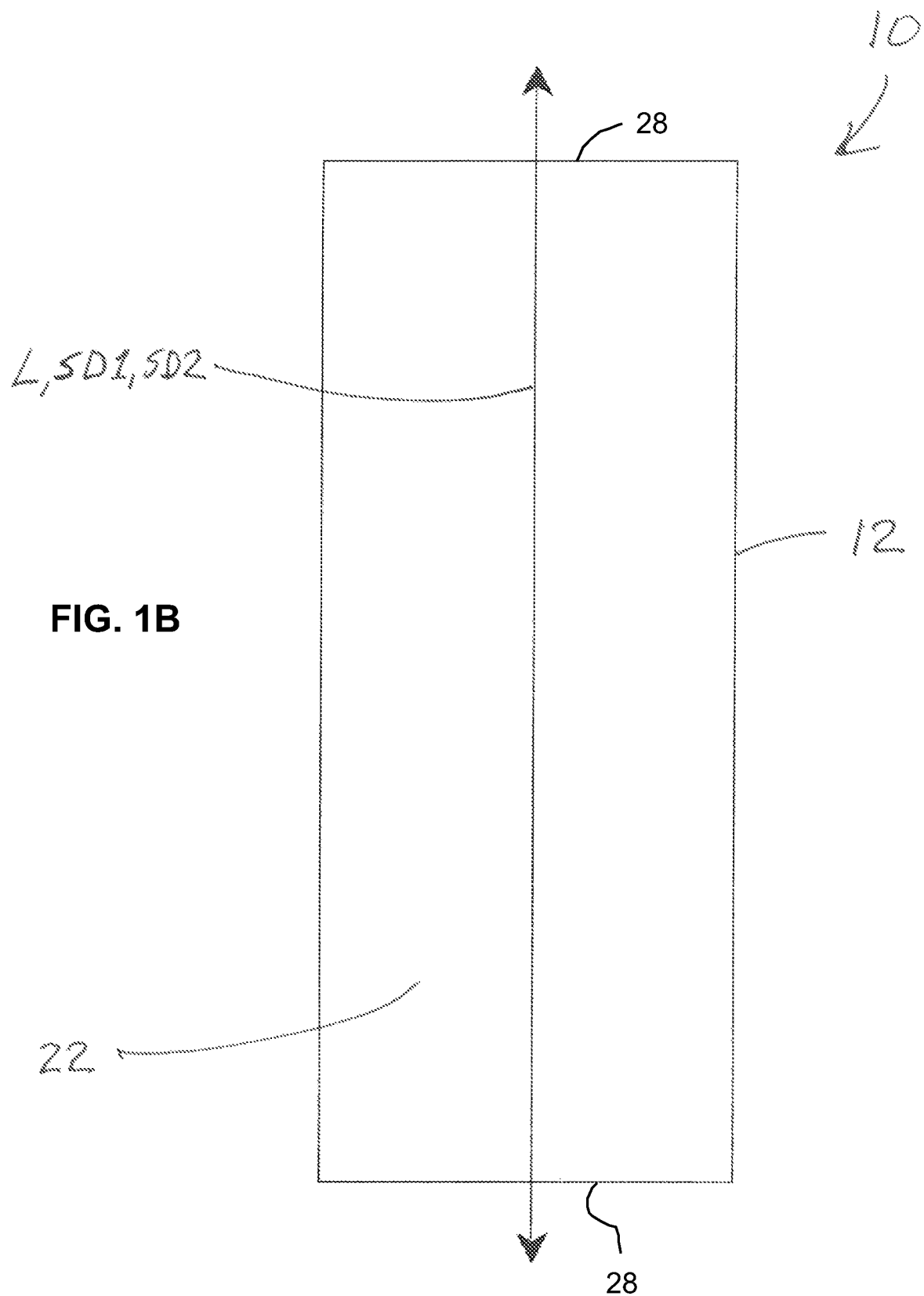
FIG. 1B is a top plan view of the surgical skills training model of FIG. 1A.

Reference is now made to FIGS. 1A and 1B which illustrate a first possible embodiment of the new and improved surgical skills training model 10. The surgical skills training model 10 includes an elongated body 12 having a muscle layer 14, a fascia layer 16, a subcutaneous tissue layer 18, a dermis or connective tissue layer 20 and a skin layer 22 all adapted to mimic the physical qualities of the human anatomy.

More particularly, the subcutaneous tissue layer 18 overlies the muscle layer 14 and the skin layer 22 overlies the subcutaneous tissue layer. The fascia layer 16 is provided between the subcutaneous tissue layer 18 and the muscle layer 14 while the connective tissue layer 20 is provided between the subcutaneous tissue layer and the skin layer 22.

The muscle layer 14 is the bottom layer of the simulated tissue comprising the body 12 of the surgical skills training model 10. As illustrated, the muscle layer 14 may include a substantially flat bottom wall 24 and a curved or rounded upper wall 26 in end profile or cross section. The bottom wall 24 may be defined by a chord while the upper wall 26 may be defined by an arc of a circle wherein the chord and the arc form a segment of the circle. The upper wall 26 preferably has a radius of curvature of between about 29 mm and about 32 mm while the chord may have a length of about 73 mm. The model 10 has a longitudinal axis L extending between the two ends 28 of the surgical skills training model 10.

The muscle layer 14 may be made from any appropriate material adapted for mimicking the physical characteristics of real muscle. In one particularly useful embodiment, the muscle layer 14 is made of a firm thick rounded-body layer of silicone, Ecoflex 00-30™ with Shore hardness 00-30. The muscle layer 14 may include a dark red pigmentation that looks like muscle and has a density that feels very similar to muscle. When a needle is inserted into the muscle layer 14, it feels very similar to the touch of putting a needle into real muscle. This makes an excellent simulation for performing intramuscular injections. This differs from prior art training models that generally are made up of similar density flat layers vs. the thick rounded-body muscle layer of the model 10. The muscle layer 14 makes the tissue much more realistic and similar to human tissue.

In human skin, there is a thin strong tight tissue over the surface of the muscle that is called fascia. The fascia layer 16 of the surgical skills training model 10 mimics this layer.

The fascia layer 16 is made from a material having a stretch direction SD1 that is aligned with the longitudinal axis L of the muscle layer 14 and the model 10. Such a material may comprise a two-way or four-way elastane.

In at least one particularly useful embodiment, the fascia layer 16 may be made from a very thin White Power Mesh Fabric 4 Way Stretch Nylon Spandex Lycra 3 oz/yard. It is 85% nylon and 15% elastane. The fabric, originally created by the Dupont Company, is marketed as Lycra. This fabric also known as Spandex, is very stretchy, but stretches more in a longitudinal direction than laterally. Such a fascia layer 16 made from this stretch material gives a realistic simulation of the needle pop going into muscle. This is also felt when an intramuscular injection is given.

The subcutaneous tissue layer 18 is adapted to simulate the fat layer under skin of the human anatomy. The subcutaneous layer 18 may be made from any appropriate material for this purpose including a soft silicon layer of Ecoflex GEL™ with Shore hardness of 000-35. This layer is approximately 5 mm thick. It may include a light yellow pigment to mimic the color of the real subcutaneous tissue.

Subcutaneous injections are practiced by placing them in this layer 18. Students learn how to undermine tissue that needs stretching for suture closure by dissecting this layer 18. The simulation of abscesses can be accurately demonstrated by injecting, for example, hand lotion into the subcutaneous layer 18 and then allowing the student to perform the procedure of incising and draining the abscess.

The connective tissue layer 20 is adapted to simulate the connective tissue layer of the human anatomy. The connective tissue layer 20 of the surgical skills training model 10 may be made from the same White Power Mesh Fabric 4 Way Stretch Nylon Spandex Lycra 3 oz/yard used to make the fascia layer 16. It is 85% nylon and 15% elastane. A connective tissue layer 20 made from such a material represents the stretch in real skin by orienting the longitudinal direction of stretch (that is, second stretch direction SD2) with the longitudinal direction of the artificial skin: that is the longitudinal axis L of the muscle layer 14. Human skin stretches more in the longitudinal direction over the underlying muscles with less stretch laterally to the muscle. The addition of this feature to the model 10 allows for accurate simulation of punch biopsies and plastic surgical flaps. Both of these procedures use the direction of skin stretch to maximize pleasing skin closures. This layer 20 also allows the practicing student to place more accurately sub-cuticular sutures by passing the suture needle along this layer.

The skin layer 22, the top color pigmented layer, may be made of Dragon Skin™ 10 Fast silicone that has a Shore hardness of 10 A. This layer 22 closely simulates the epidermis and dermis of natural skin. It has a textured tough skin feel to it that is very similar to normal human skin and gives a very realistic simulation of skin when a suture needle or injection needle inserts into it. This layer 22 is approximately 1.5 mm thick.

Figure 2:
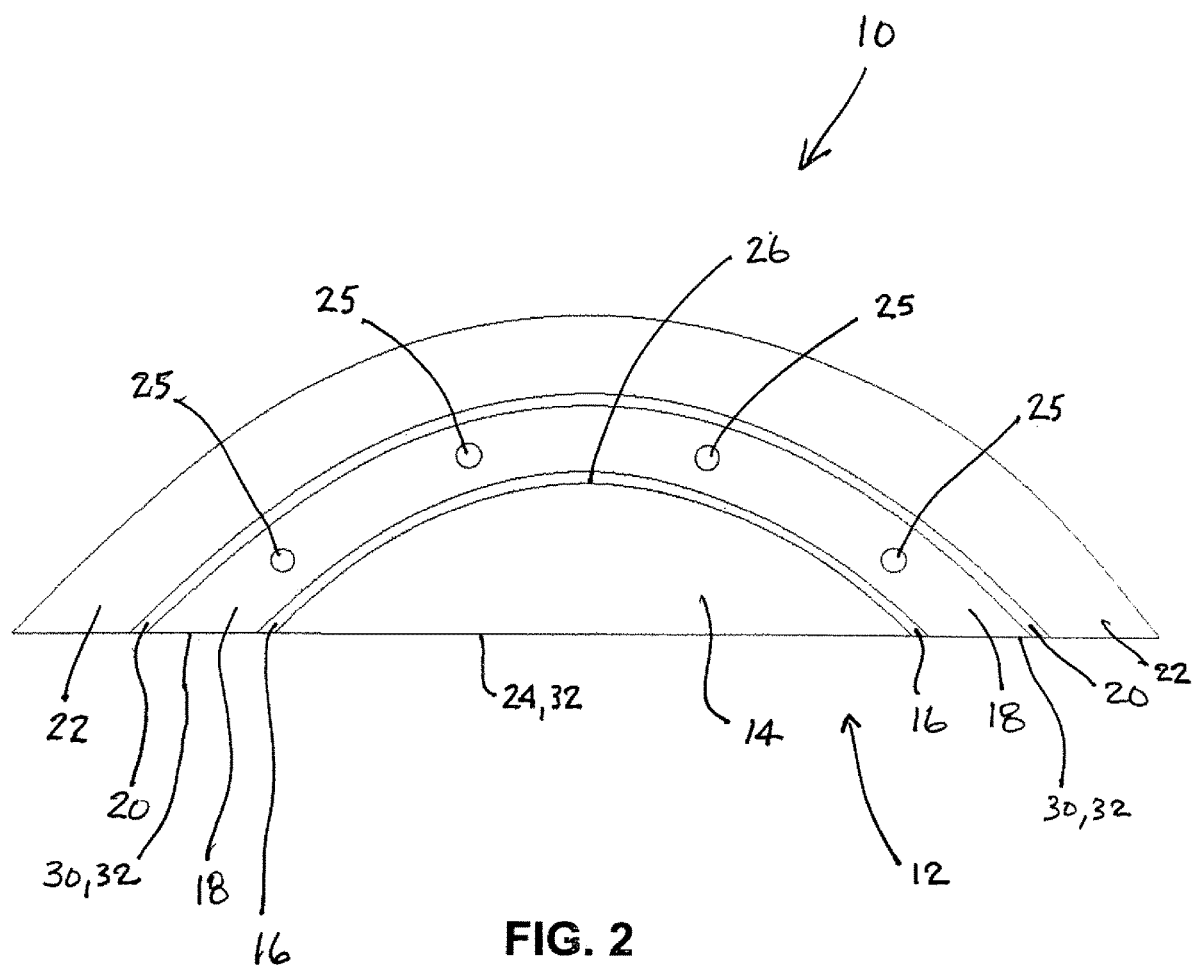
FIG. 2 is an end view of an alternative embodiment of the surgical skills training model that includes four blood vessels.

Since many of the veins in human skin are in the fat layer, the surgical skills training model 10 may be manufactured with silicon tubing of 3/16" or 1/8" diameter placed in the subcutaneous layer 16 as illustrated by the alternative embodiment of FIG. 2. Colored water or artificial blood may be infused into the veins 25 with a gravity feed. This is a very accurate simulation of normal human blood vessels and allows for the practice of starting intravenous infusion or drawing blood before the student has to perform these procedures on a patient.

Either embodiment of the new and improved surgical skills training model 10 illustrated in FIGS. 1A and 1B and FIG. 2 features the "feel" of real skin and tissue when performing suturing or other surgical skills. The type of silicon used, and the thickness and texturing created by the manufacturing process creates the unique feeling of realistic skin. The layers accurately simulate skin and the four underlying types of tissue—dermis, subcutaneous (fat) layer, fascia and muscle. This feature is achieved by using varying textures and densities of silicone combined with two stretch type mesh layers. The skin and subcutaneous layers 20, 22 are thin and maintain uniform thickness that overlay the curved upper surface 24 of the muscle layer 14, a soft round bodied layer like true muscle tissue.

The dermis/connective tissue and fascia layers 16, 20 are made of a stretch type mesh, which is oriented in a specific direction during manufacture, to allow the tissue to stretch in a longitudinal direction more than latitudinal across the skin. This mimics the true stretch of human skin. It allows the student to realistically practice punch biopsies and plastic surgical flaps with suture closures.

The simulated tissue is a safe, food grade, silicon that can be washed and/or autoclaved, if cleanliness or contamination becomes a question. The surgical skills training model 10 can be used many times without deterioration for many months so that students can practice repeatedly during their own time.

Figure 3:
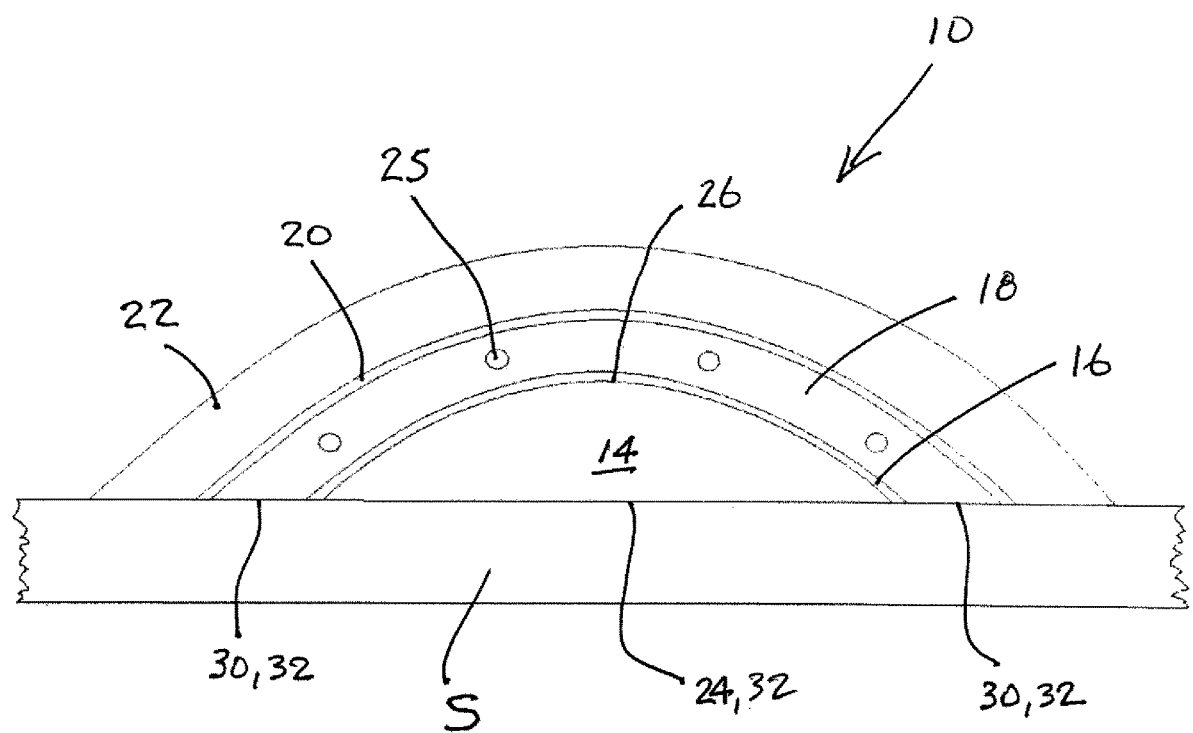
FIG. 3 is an end view illustrating how the surgical skills training model rests securely on a support surface such as the table top shown.

As previously noted in the Background Section above, the surgical skills training model 10 can be used for a wide variety of minor surgical and clinical skills, more than any simulated product currently commercially available. Advantageously, as best illustrated in FIG. 3, the substantially flat bottom wall 24 of the muscle layer 14 and the opposed exposed edges 30 of the subcutaneous tissue layer 18 form a substantially planar base 32 adapted for engaging an underlying support surface S (such as a table top) upon which the surgical skills training model 10 rests. More specifically, the bottom wall 24 provides a rigid base to maintain contact with the support surface S and the soft opposed edges 30 of the subcutaneous tissue layer 18 to provide adherent properties to hard surfaces such as a table top. This better holds the model 10 in position while performing different medical procedures.

Experimental Example

There are three layers, skin, subcutaneous and muscle. Each layer is separated by a nylon mesh fabric layer that stretches more in the longitudinal direction of the finished product than cross ways.

(a) The skin layer is poured onto a textured flat surface to replicate skin texture and uniform thickness.

(b) The subcutaneous layers is also poured flat to produce uniform thickness. The muscle layer is poured after the first two layers are placed in a 4 inch diameter trough.

(c) The muscle layer is poured into this mold to produce a layer that is about 1.5 inches thick in the middle and tapers to very thin on the edges so that the final product is flat on the bottom and a rounded surface on the top. This creates a product that replicates a body structure like an arm that has a rounded surface and has sufficient depth that injections can be given, deep sutures or superficial sutures can be placed.

The timing for adding each layer is dependent on the set up time of each material. The previous product (layer) should be almost set, but still tacky when the mesh and next layer is added.

The total product is between 1.75 and 2 inches thick in the center with the skin layer following the curved surface until it meets the bottom flat surface of the muscle layer. The product is typically poured in 4 foot sections, but the amount of silicone material will very for each layer dependent on the length of product that is produced at one time. The diameter of the product should remain constant at 4 inches so as to be a convenient size and shape to make the suturing experience most realistic.

Layers of the Skin by Material Used and Thickness (a) Epidermis Dermis layer—made with Dragon Skin FX™ Pro supplied by the Smooth-on, Inc. company with a Shore hardness of 2 A. This layer should range from 0.5 mm to 2 mm in thickness.

Colored with small amounts of Slic Pig® skin color yellow, blood, brown and/or black to produce a various skin tone colors. These can be varied to mimic variations in skin coloring to represent the variations in ethnic and racial differences found in natural skin tones. This makes a realistic variety of skin tones that a student may encounter in medical practice. Other variations can be made to mimic cyanosis, jaundice or erythema.

(b) Subcutaneous layer—made with Ecoflex™ Gel supplied by the Smooth-on, Inc. company with a Shore hardness of 000-35. This layer should range from 3 mm to 6 mm in thickness.

Colored with small amount of Slic Pig® yellow and white pigment to produce a light lemon or straw color which can be varied slightly to mimic variations in subcutaneous tissue coloring.

(c) Muscle layer—made with Ecoflex™ 00-30 supplied by the Smooth-on, Inc. company with a Shore hardness of 00-30. The thickness of this layer is not critical as long as the silicone volume is sufficient to fill the mold to the desired height of about 50 mm or less.

Colored with small amount of Slic Pig® blood and red pigment to produce a darker red color, which can be varied slightly to mimic variations in muscle coloring.

Example: 4" diameter half circle mold and 4 feet long

Epidermis/Dermis layer—Dragon Skin FX™ Pro 200-275 ml

Mesh Layer

Subcutaneous layer—made with Ecoflex™ gel—300-350 ml (Alternative 2:1 Slacker+Dragon Skin Fast 10)

Mesh Layer

Muscle layer—made with Ecoflex™ 00-30-700-800 ml (Alternative Dragon Skin 10 Fast)

Total volume 1200 ml-1475

The edges are then trimmed and the product cut into twelve 4-inch lengths, which is an ideal size to use in a suturing workshop or for practicing immunizations, If silicone tubing is added between the skin layer and the subcutaneous layers, the sections can be cut in six 8"

sections and in addition, the product can be used for training students to start IV infusions or practice phlebotomy.

Note: The different hardness of the layers can also be made by starting with Dragon Skin Pro™ and adding Slacker® to achieve the desired hardness of the silicone. It should be noted that all of the silicone products are skin safe and food grade products. Thi-vex makes all the silicone products thicker and Slacker makes all silicone products softer to achieve desirable results.

TABLE NO. 1

|  | Ecoflex ™ GEL | Ecoflex ™ 00-30 | Dragon Skin ™ FX-Pro |  |
| --- | --- | --- | --- | --- |
| Skin Layer | Subcutaneous Fat | Muscle Layer | Dermis/Epidermis |  |
| Alternative Comparision | 2:1 Slacker + Dragon Skin Fast 10 | Dragon Skin 10 Fast |  | Alternative Comparison Mixture |
| Mold | Divided 4 inch cylinder, 4 foot long, PVC pipe | Poured on flat surface | Poured on flat surface |  |
| Amount | 350 cc | 800 cc | 275 cc |  |
| Silic-PIgment |  |  |  |  |
| Product Type | Silicone Rubber - Platinum Cure Skin Safe FX Materials | Silicone Rubber - Platinum Cure | Silicone Rubber - Platinum Cure Skin Safe FX Materials | Silicone Rubber - Platinum Cure |
| Mixed Viscosity | 9,300 cps | 3,000 cps | 18,000 cps | 23,000 cps |
| Mix Ratio By Volume | 1A:1B | 1A:1B | 1A:1B | 1A:1B |
| Mix Ratio By Weight | 1A:1B | 1A:1B | 1A:1B | 1A:1B |
| Pot Life | 15 minutes | 45 minutes | 12 minutes | 8 minutes |
| Cure Time | 2 hours | 4 hours | 40 minutes | 75 minutes |
| Shore A Hardness | 000-35 | 00-30 | 2 | 10 |
| Specific Gravity | 0.98 g/cc | 1.07 g/cc | 1.062 g/cc | 1.07 g/cc |
| Specific Volume | 28 cu. in./lb. | 26.0 cu. in./lb. | 25.0 cu. in./lb. | 25.8 cu. in./lb. |
| Color | Translucent | Translucent | Translucent | Translucent |
| Die B Tear Strength | — | 38 pli | 61 pli | 102 pli |
| Tensile Strength | — | 200 psi | 288 psi | 475 psi |
| Elongation @ Break | >1000% | 900% | 763% | 1,000% |
| 100% Modulus | — | 10 psi | 37.8 psi | 22 psi |
| Shrinkage | <.001 in/in | <.001 in./in. | <.001 in./in. | <.001 in./in. |
| Useful Temperature (min) | — | −65° F. | — | −65° F. |
| Useful Temperature (max) | — | 450° F. | — | 450° F. |

Each of the following terms written in singular grammatical form: "a", "an", and the", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

Terms of approximation, such as the terms about, substantially, approximately, etc., as used herein, refers to ±10% of the stated numerical value or indicated structure. Uses of the terms parallel or perpendicular are meant to mean approximately meeting this condition, unless otherwise specified.

It is to be fully understood that certain aspects, characteristics, and features, of the surgical skills training model, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the surgical skills training model which are illustratively described and presented in combination or sub-combination in the context or format of a single embodiment may also be illustratively described and presented in the context or format of a plurality of separate embodiments.

Although the surgical skills training model of this disclosure has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations fall within the spirit of, and are encompassed by, the broad scope of the appended claims.

The foregoing has been presented for purposes of illustration and description. It is not intended to be exhaustive or to limit the embodiments to the precise form disclosed. Obvious modifications and variations are possible in light of the above teachings. For example, the shape and thickness of the various layers 14, 16, 18, 20, 22 of the model 10 may be altered to mimic particular structures (e.g., arm or leg) of the human anatomy or the anatomy of other animals for training purposes. All such modifications and variations are within the scope of the appended claims when interpreted in accordance with the breadth to which they are fairly, legally and equitably entitled.

What is claimed:

1. A surgical skills training model, comprising:
a muscle layer having a bottom wall and a curved upper wall;

a subcutaneous tissue layer overlying said curved upper wall;

a fascia layer between the subcutaneous tissue layer and the muscle layer wherein the fascia layer is made from an elastane material that stretches more in a longitudinal direction than a lateral direction wherein the longitudinal direction is aligned with a longitudinal axis of the muscle layer;

a skin layer overlying said subcutaneous tissue layer; and a connective tissue layer between the subcutaneous tissue layer and the skin layer wherein the connective tissue layer is made from a second elastane material that stretches more in a longitudinal direction than a lateral direction wherein the longitudinal direction is aligned with the longitudinal axis of the muscle layer.

2. The surgical skills training model of claim 1, wherein the bottom wall and opposed edges of said subcutaneous tissue layer form a base adapted for engaging a support surface upon which the surgical skills training model rests.

3. The surgical skills training model of claim 2, further including at least one simulated blood vessel inbetween the skin layer and the subcutaneous tissue layer.

4. The surgical skills training model of claim 1, wherein the bottom wall is flat.

5. A surgical skills training model, comprising:
a muscle layer;
a subcutaneous tissue layer overlying the muscle layer;
a skin layer overlying the subcutaneous tissue layer; and
a connective tissue layer between the subcutaneous tissue layer and the skin layer, the connective tissue layer being made from an elastane material that stretches more in a longitudinal direction than a lateral direction having the longitudinal direction aligned with a longitudinal axis of the muscle layer.

6. A surgical skills training model, comprising:
a muscle layer having a substantially flat bottom wall and a curved upper wall;
a subcutaneous tissue layer overlying the curved upper wall;
a fascia layer between the subcutaneous tissue layer and the muscle layer wherein the fascia layer is made from an elastane material that stretches more in a longitudinal direction than a lateral direction wherein the longitudinal direction is aligned with a longitudinal axis of the muscle layer; and
a skin layer overlying the subcutaneous tissue layer wherein the substantially flat bottom wall and opposed edges of said subcutaneous tissue layer form a base adapted for engaging a support surface upon which the surgical skills training model rests.

* * * * *